United States Patent [19]

Hibbard

[11] 4,121,245
[45] Oct. 17, 1978

[54] IMAGE REGISTRATION SYSTEM FOR VIDEO CAMERA

[75] Inventor: Earl R. Hibbard, Berkeley, Calif.

[73] Assignee: Teknekron, Inc., Berkeley, Calif.

[21] Appl. No.: 786,448

[22] Filed: Apr. 11, 1977

[51] Int. Cl.$^2$ .................. H04N 7/18; G01B 11/26; G06K 9/04

[52] U.S. Cl. .................. 358/102; 340/146.3 H; 356/172

[58] Field of Search ............... 358/101, 102; 340/146.3 H; 350/285, DIG. 1, DIG. 2; 353/27; 355/40, 41, 43; 356/172

[56] References Cited

U.S. PATENT DOCUMENTS

| | | | |
|---|---|---|---|
| 3,414,731 | 12/1968 | Sperry | 340/146.3 Z |
| 3,701,098 | 10/1972 | Acker | 340/146.3 Z |
| 3,870,814 | 3/1975 | Woods | 358/102 |

*Primary Examiner*—Howard W. Britton
*Attorney, Agent, or Firm*—Flehr, Hohbach, Test, Albritton & Herbert

[57] ABSTRACT

An image registration system for a video camera is used in an optical information retrieval system in a manner to accurately register a pre-recorded image relative to the target of a T.V. camera. A light responsive array defines the outline of an area corresponding in size and shape to that of the target and the image is simultaneously projected upon both the target and the light responsive array. In the event that the image is off-center with respect to the target, the light responsive elements serve to generate control signals for operating servo motors connected to mirrors for readjusting the light path along each of two predetermined axes. This movement causes the image (which is either transmitted to a monitor or which is later scanned from the target and recorded on a magnetic recording medium or the like) to be precisely centered or otherwise disposed at a predetermined position. According to a second embodiment the light responsive means has been disposed within the monitor whereby upon projection of the image at the monitor is sensed by the light responsive means. If the image is off-center or improperly oriented on the screen, control signals are generated for adjusting the light path transmitting the image into the camera so as to accurately register the image on the face of the monitor.

6 Claims, 6 Drawing Figures

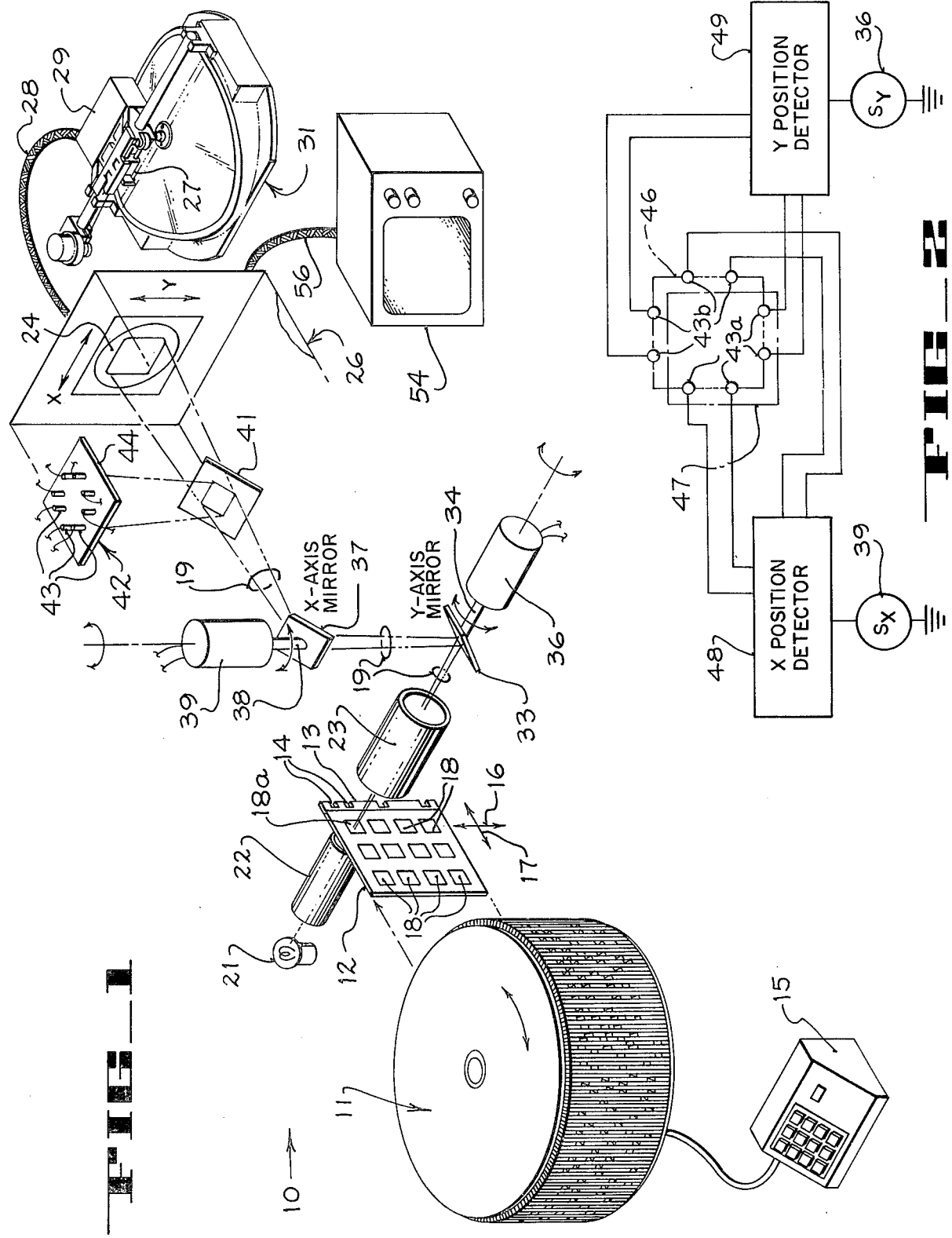

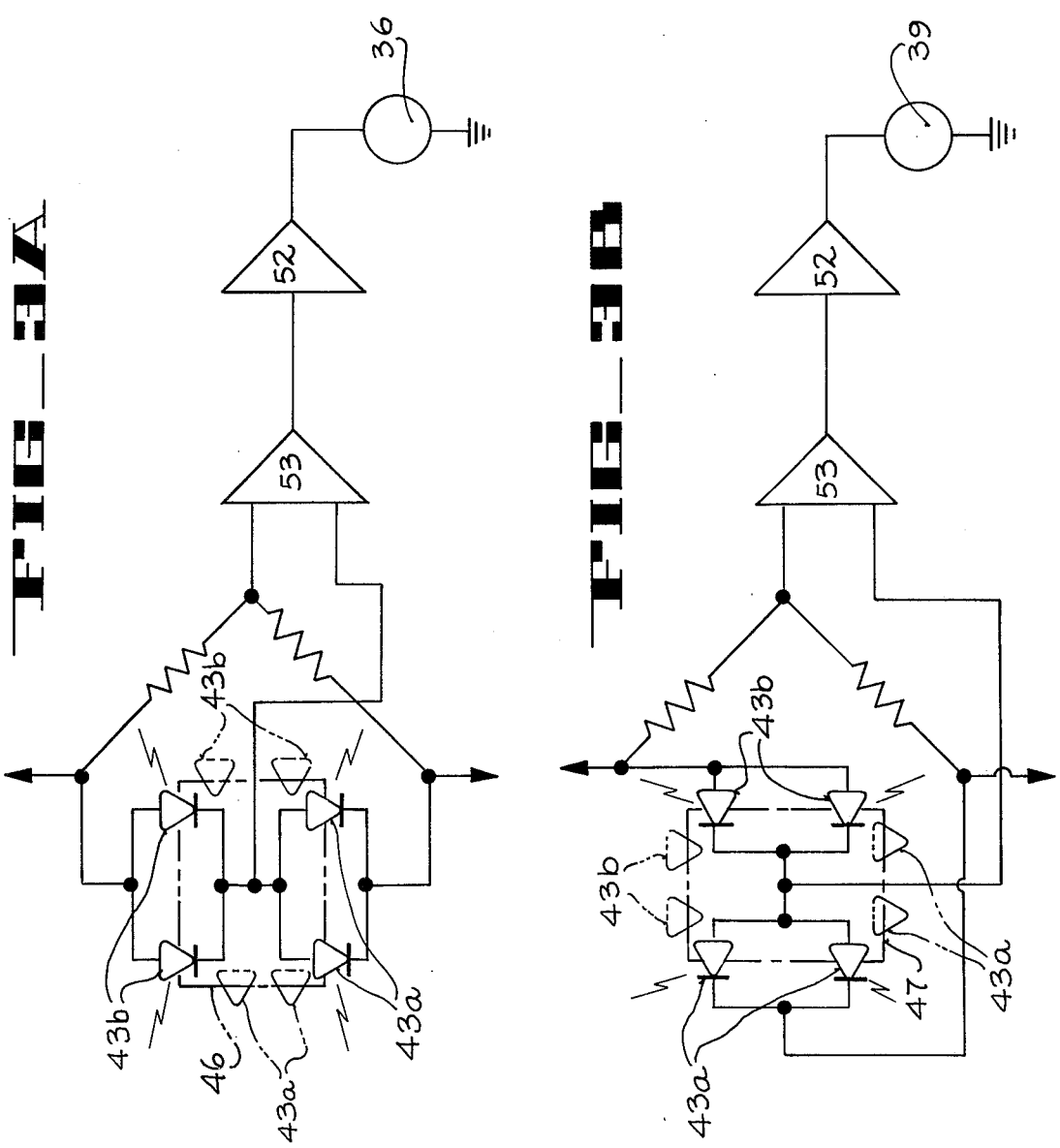

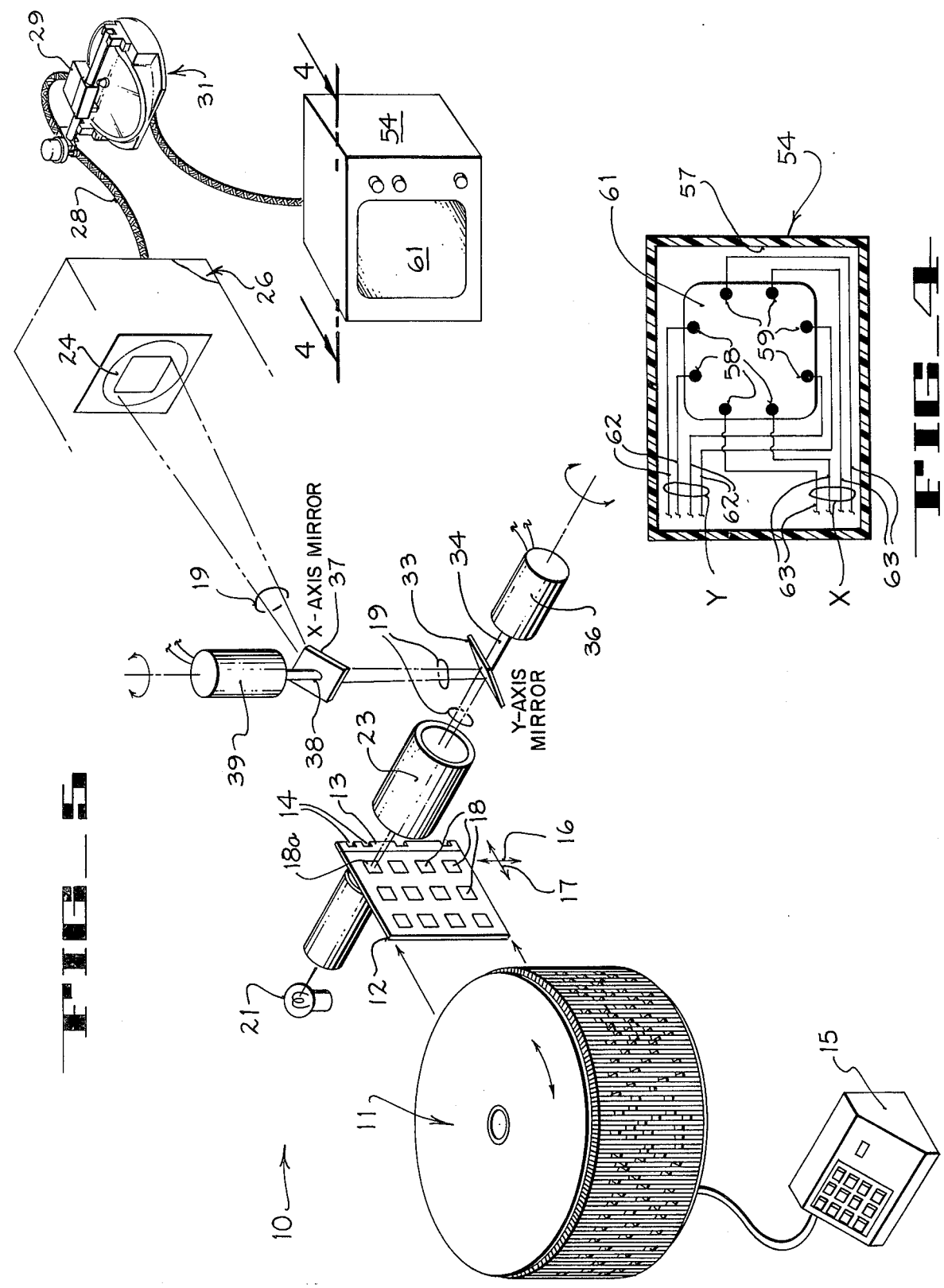

IMAGE REGISTRATION SYSTEM FOR VIDEO CAMERA

BACKGROUND OF THE INVENTION

This invention pertains to an image registration system for use with a video camera and more particularly to a system for insuring that the image transmitted into a T.V. camera is properly registered with respect to the "target" or other light responsive means in the image plane of the T.V. camera whereby the image will be properly registered on a given monitor or, as scanned from the target, the image will be properly transmitted to be recorded.

Heretofore, in systems for projecting a pre-recorded image of a document into a T.V. camera in a manner so that the image can be accurately recorded from the camera onto a magnetic medium or displayed on a monitor, an important problem has been encountered in accurately registering the image on the target of the camera so that it can be properly recorded or displayed. One means for adjusting the location of the image is to attempt to position the medium which carries the pre-recorded image. Such arrangements have been difficult to provide at an economic price. Where the image is to be displayed, an additional problem is encountered since the usual T.V. camera is subject to conditions of "drift" or the like. Elaborate and expensive mechanisims and devices have been provided in the past in an attempt to overcome the foregoing problems and accordingly it is evident that there is a need for an improved image registration system for a T.V. camera.

OBJECTS AND SUMMARY OF THE INVENTION

In general there is provided a system for accurately registering the position of an image with respect to light responsive means of a T.V. camera. Means forming a light path for transmitting an image therealong to the camera are provided to include movable mirror means in the light path. Positioning means serve to move the mirror means to displace the light path to cause the image to be displaced with respect to the light responsive means. Further, means for detecting inaccurate registration of the image relative to the light responsive means of the camera serves to operate the positioning means so as to cause the image to be moved into predetermined registration as defined by the light responsive means.

Generally, according to an additional embodiment, the means for detecting inaccurate registration of the image relative to the light responsive means is located in a manner to directly sense the projected image within a monitor.

In general it is an object of the present invention to provide an improved image registration system for a T.V. camera as for recording or monitoring therefrom.

It is another object of the present invention to provide such a system wherein the detecting function further serves to adjust the location of an image projected onto light responsive means in a T.V. camera.

It is a further object of the invention to provide a system of the kind described in which the means for detecting displacement of the image on the monitor is located so as to be subjected directly to the projected image.

The foregoing and other objects of the invention will become more readily evident when considered in conjunction with the drawings.

BRIEF DESCRIPTION OF THE DRAWINGS

FIG. 1 shows a diagramatic perspective view of a system according to the invention;

FIG. 2 shows a diagramatic view of means for detecting the registration of an image;

FIGS. 3A and 3B show electrical diagrams of a bridge circuit employing light responsive photo diodes for detecting registration of the image of a document with respect to the target in the camera;

FIG. 4 shows a diagramatic section view taken along the line 4—4 of FIG. 5 according to another embodiment of the invention;

FIG. 5 shows a diagramatic view of a system according to another embodiment of the invention.

DETAILED DESCRIPTION OF PREFERRED EMBODIMENTS

As shown in FIG. 1 an information retrieval system 10 employs a carousel 11 of a type adapted to contain a number of microfiche units 12 formed along their radially outer edge 13 with coded openings 14 disposed at different conbinations of locations along edge 13. A controller represented by keyboard unit 15 serves to position a selected microfiche unit 12 whereby means (not shown) represented by the arrows 16, 17 of known construction selects a given one of the units 12 and withdraws it from carousel 11 to position a given one 18a of the prerecorded images 18 into a light path 19.

The means for handling microfiche units 12 in the above manner are believed well-known and can be purchased. Hence, further description of that portion of the aparatus represented is not believed necessary. Light path 19 is defined initially by means of the light source 21, a condensing lens 22, the prerecorded image 18a, and a projection lens 23.

Light path 19 is next directed to the "target" 24 or other light responsive means on the image plane of T.V. camera 26.

According to one embodiment of the invention, camera 26 is coupled to a video disc recording system 27 as diagramatically illustrated in FIG. 1.

A cable 28 couples the system's electronics 29 to camera 26. In operation of a system of the kind described the image to be recorded upon the rotating disc of assembly 31 is first projected onto and held by the target 24 of camera 26. The recorded image upon target 24 is then scanned off to be recorded. Accordingly, the image, as projected upon target 24 or other light responsive means disposed in the image plane of camera 26 must be accurately registered with respect to target 24 since this position determines where the image will later appear, and must be recorded with accurate registration.

Light path 19 further includes a Y-axis mirror 33 mounted on the end of a motor shaft 34 of a DC servo motor 36. As shown in FIG. 1 mirror 33 is disposed at an angle of 45° to the horizontal so that an image being projected along light path 19 is diverted at right angles upwardly to an X-axis mirror 37 similarly mounted on the end of a motor shaft 38 extending downwardly from DC servo motor 39. Mirror 37 is also disposed at an angle of 45° to the axis of shaft 38 for deflecting the image further along light path 19 to a fixed or stationary mirror 41.

Means for splitting the light path 19 to transmit the image along two separate portions 19a, 19b thereof comprises the stationary mirror 41. Thus, one of the light path portions 19a is directed to the light responsive means 24 of camera 26 whereas the other portion 19b is directed to a position detecting array 42. Mirror 41 is partially silvered so that approximately 50% of the light directed upon it passes directly through to target 24. The other half is reflected upwardly to array 42.

In order that the image projected onto the face of array 42 is simultaneously in focus with the image focused onto target 24, array 42 is spaced from the reflecting face of mirror 41 a distance equal to the distance between target 24 and mirror 41.

Array 42 comprises a plurality of photo diode elements 43 mounted in a substrate of printed circuit board material such as a glass filled epoxy, (or epoxy-glass). Photo diode elements 43 are disposed, as best shown in FIGS. 2 and 3.

Aparatus of the kind described is believed largely useful in handling the images of documents such as letters and correspondence wherein the margin of the letter will be predominately of a white or light coloration. A negative image of such a document provides a dark margin therearound recorded upon an otherwise transparent film. Accordingly, by projecting such a pre-recorded image upwardly onto the undersurface of substrate 44 if the lenses and mirrors are properly in position the image will be projected to lie exactly within the region 46 shown by the two dot phantom line in FIG. 2. On the other hand if the image is displaced from its precise position, as illustrated by the single dot phantom line figure 47, photo diode elements 43a become more occluded and their output drops. The remaining photo diode elements 43b become less occluded and their output increases.

As shown in FIG. 2, X-axis and Y-axis position detectors 48, 49, are shown and each comprises a bridge circuit of the kind shown in FIG. 3. Each of the bridge circuits 51 drives an associated DC servo motor 36, 39 through a motor drive amplifier 52 and a differential amplifier 53. With the image projected at the region 46 in precise registration with the X axis or Y axis photo diodes the bridge will be entirely balanced and there will be entirely balanced and there will be no output signal. However, when the image moves to another position such as shown in FIG. 2 at 47 those photo diodes 43b which become less occluded receive more light and serve to generate an unbalancing signal so as to operate the DC servo motors 36, 39 in a direction and in an amount suitable to adjust the light path so that it falls precisely in registration on target 24.

Thus, the detecting means comprises circuit means as shown in FIGS. 3A, 3B and an array of light responsive elements disposed in a configuration representative of the bounds of the image. Those elements disposed on opposite sides of the configuration are paired to form portions of a circuit to provide signals from the circuit representing the degree and direction of misregistration between the image and the light responsive target 24.

According to another embodiment as shown in FIGS. 4 and 5 the means for detecting registration of the image and for adjustment of the light path 19 has been disposed within monitor 54. Accordingly, in FIG. 4 a photo diode array 58 is disposed within the cabinet 57 to be positioned adjacent the periphery of a cathode ray tube 61 when monitor 54 is assembled. The outputs of photo diodes located at the bottom and top of cabinet 57 are connected along leads 62 to a Y-position detector 49 such as shown in FIG. 2 whereas the other leads 63 in FIG. 4 are directed outwardly of cabinet 57 to an X-position detector 48.

The arrangement shown in FIGS. 4 and 5 has the advantage of being able to provide a correction in the registration of an image on target 24 in a manner also correcting for drift originating in camera 26 or elsewhere in the system. In short, the system shown in FIG. 5 examines the image as it is being monitored to remove all registration errors from the system wherever introduced.

From the foregoing it shall be readily evident that there has been provided an improved image registration system for a video camera such as coupled to a recorder or to a monitor or the like.

What is claimed is:

1. In a system for accurately projecting an image of a prerecorded image upon light responsive means of a T.V. camera comprising a light source projecting light along a predetermined path, means for supporting a prerecorded image of a document in a plane disposed across said path, said light path transmitting an image of said prerecorded image therealong to the camera, movable mirror means in said light path for deflecting the light path and image, positioning means for moving said mirror means to displace the light path to move the image with respect to said light responsive means, means including at most one partially silvered mirror in said light path for detecting inaccurate registration of said image relative to said light responsive means along each of two mutually perpendicular axes and serving to operate said positioning means to move said mirror means to cause the image to be moved into predetermined registration with respect to said light responsive means, the last named means comprising first and second circuit means and an array of light responsive elements disposed in a configuration coextensive with the bounds of the image, those of said elements disposed on opposite sides of said configuration being paired to form portions of an associated one of said first or second circuit means to provide signals from said first or second circuit representing the degree and direction of misregistration between the image and said light responsive means with respect to an associated one of said pairs of elements.

2. In a system for registering the position of an image with respect to light responsive means of a T.V. camera comprising a T.V. camera, means for supporting a prerecorded image of a document in a plane, a light source forming a light path through said prerecorded image for transmitting an image thereof to said camera, a first mirror in said light path, positioning means for moving said first mirror to displace the light path to move said image along a first predetermined axis and for moving said second mirror to displace the light path to move said image along a second predetermined axis, means including at most one partially silvered mirror in said light path for detecting the position of said image along each of said axes relative to registration of the image with respect to said light responsive means, and means responsive to the last named means for operating said positioning means to move the mirrors to cause the image to be moved with respect to said lgiht responsive means.

3. A video system comprising a T.V. camera of a type employing light responsive means in the image plane of the camera adapted to receive thereon an image in predetermined registration therewith, means defining a light path passing through the plane of a prerecorded image for transmitting the image, movable mirror means in said light path for changing the direction of the light path and the image carried thereby, positioning means for moving the mirror means to change the direction of the light path to vary the registration of the image with respect to said light responsive means, means for detecting inaccurate registration of said image with respect to said light responsive means, and means responsive to the last named means to operate said positioning means to move said mirror means to cause the image to be moved into registration with respect to said light responsive means.

4. In a video system according to claim 3 wherein detecting means comprises an array of light responsive elements disposed in a configuration representative of the bounds of the image when registered with said light responsive means, and first and second bridge circuit means including said elements for providing output signals to operate said positioning means respectively along first and second mutually perpendicular axes, said output signals representing the degree and direction of misregistration between said image and said light responsive means.

5. A viewing system for maintaining a predetermined registration of an image with respect to a viewing screen comprising means supporting a prerecorded image in a plane, a light source disposed on one side of said plane to project light through said image to the other side of said plane to transmit an image of said prerecorded image along a light path, movable mirror means in said light path for adjusting the position of said image therein to provide said registration, means serving to detect the disposition of said light path and image projected therealong when providing said predetermined registration of said image, the last named means being disposed directly in said path to receive said image of said prerecorded image at a substantially undiminished energy level, and means responsive to said detecting means for moving said mirror means in a direction and in a degree sufficient to dispose the image at a position in said light path to provide said predetermined registration.

6. In a system for accurately registering the position of an image with respect to light responsive means in a video camera comprising means forming a light path through the plane of a prerecorded image for transmitting an image thereof to the camera, movable mirror means in said light path for deflecting the light path and the last named image, positioning means for moving said mirror means to displace the light path to move the last named image with respect to said light responsive means, means for detecting inaccurate registration of said image relative to said light responsive means, means serving to split said light path at most once to transmit said image along two separate portions thereof, one of said light path portions being directed to said light responsive means and the other portion being directed to said detecting means, and means responsive to said detecting means for operating said positioning means to cause the image to be moved into predetermined registration with respect to both said light responsive means and said detecting means.

* * * * *